US008644200B2

(12) United States Patent
Willenegger et al.

(10) Patent No.: US 8,644,200 B2
(45) Date of Patent: Feb. 4, 2014

(54) TIME MULTIPLEXING OF UNICAST AND MULTICAST SIGNALS ON A DOWNLINK CARRIER FREQUENCY IN A WIRELESS COMMUNICATION SYSTEM

(75) Inventors: Serge D. Willenegger, Onnens (CH); Edward G. Tiedemann, Jr., Concord, MA (US)

(73) Assignee: QUALCOMM Incorporated, San Diego, CA (US)

( * ) Notice: Subject to any disclaimer, the term of this patent is extended or adjusted under 35 U.S.C. 154(b) by 839 days.

(21) Appl. No.: 11/227,688

(22) Filed: Sep. 14, 2005

(65) Prior Publication Data

US 2006/0098567 A1    May 11, 2006

Related U.S. Application Data

(60) Provisional application No. 60/621,440, filed on Oct. 22, 2004.

(51) Int. Cl.
*H04B 7/00* (2006.01)

(52) U.S. Cl.
USPC ............ 370/310; 370/206; 370/341; 370/329

(58) Field of Classification Search
USPC .................................. 370/310, 206, 341, 329
See application file for complete search history.

(56) References Cited

U.S. PATENT DOCUMENTS

| 6,804,253 | B2 | 10/2004 | Western |
| 6,885,630 | B2 | 4/2005 | Kostic et al. |
| 7,292,854 | B2* | 11/2007 | Das et al. ...................... 455/434 |
| 7,630,725 | B2 | 12/2009 | Kwak et al. |
| 7,633,899 | B2 | 12/2009 | Choi et al. |
| 2002/0086691 | A1 | 7/2002 | Kostic et al. |
| 2003/0035403 | A1* | 2/2003 | Choi et al. ...................... 370/342 |
| 2003/0088695 | A1* | 5/2003 | Kwak et al. ...................... 709/238 |
| 2003/0157953 | A1 | 8/2003 | Das et al. |
| 2004/0114555 | A1* | 6/2004 | Hayashi et al. ............... 370/329 |
| 2004/0141481 | A1 | 7/2004 | Lee et al. |

(Continued)

FOREIGN PATENT DOCUMENTS

| CN | 1414726 | 4/2003 |
| JP | 2003158486 | 5/2003 |

(Continued)

OTHER PUBLICATIONS

International Preliminary Report of Patentability—PCT/US2005/038517, International Search Authority—The International Bureau of WIPO—Apr. 24, 2007.

(Continued)

*Primary Examiner* — Justin Lee
(74) *Attorney, Agent, or Firm* — Jeffrey D. Jacobs; W. Chris Kim

(57) ABSTRACT

A remote station, for a wireless communication system, includes a receiver configured to receive on a first downlink a synchronization control channel on a first carrier frequency and on a second downlink a shared physical channel on a second carrier frequency different than the first carrier frequency. The shared physical channel includes a first physical shared channel having a unicast signal and a second physical shared channel having a multicast or broadcast signal, the unicast signal being multiplexed in time with the multicast or broadcast signal. The remote station includes a control processor configured to generate an acknowledgement signal on an uplink based on the unicast signal.

24 Claims, 7 Drawing Sheets

(56) References Cited

U.S. PATENT DOCUMENTS

| | | | |
|---|---|---|---|
| 2004/0213214 A1* | 10/2004 | Jung et al. | 370/352 |
| 2005/0063345 A1* | 3/2005 | Wu et al. | 370/335 |
| 2005/0243855 A1* | 11/2005 | Dominique et al. | 370/441 |
| 2006/0013182 A1* | 1/2006 | Balasubramanian et al. | 370/343 |

FOREIGN PATENT DOCUMENTS

| | | |
|---|---|---|
| JP | 2006515139 A | 5/2006 |
| KR | 200315151 | 2/2003 |
| WO | 2004021635 A | 3/2004 |
| WO | WO2004045238 | 5/2004 |
| WO | 2005071867 A | 8/2005 |

OTHER PUBLICATIONS

International Search Report—PCT/US2005/038517, International Search Authority—European Patent Office—Mar. 14, 2006.
Written Opinion—PCT/US2005/038517, International Search Authority—European Patent Office—Apr. 22, 2007.
Taiwan Search Report—TW094137046—TIPO—Oct. 27, 2011.
Translation of Office Action in Korean application 10-2009-7005478 corresponding to U.S. Appl. No. 11/227,688, citing KR200315151 dated Feb. 22, 2011.

* cited by examiner

US 8,644,200 B2

TIME MULTIPLEXING OF UNICAST AND MULTICAST SIGNALS ON A DOWNLINK CARRIER FREQUENCY IN A WIRELESS COMMUNICATION SYSTEM

CLAIM OF PRIORITY UNDER 35 U.S.C. §119

The present Application for Patent claims priority to Provisional Application No. 60/621,440 entitled "Time Multiplexing of Unicast and Multicast Data in a Multi-Carrier Communication System" filed Oct. 22, 2004, and assigned to the assignee hereof and hereby expressly incorporated by reference herein.

BACKGROUND

1. Field

The present invention relates generally to wireless communication, and more specifically to cellular wireless communication.

2. Background

The field of communications has many applications including, e.g., paging, wireless local loops, Internet telephony, and satellite communication systems. An exemplary application is a cellular telephone system for mobile subscribers. (As used herein, the term "cellular" system encompasses both cellular and personal communications services (PCS) system frequencies.) Modern communication systems, such as a wireless communication system, designed to allow multiple users to access a common communications medium have been developed for such cellular systems. These modern communication systems may be based on multiple access techniques such as code division multiple access (CDMA), time division multiple access (TDMA), frequency division multiple access (FDMA), space division multiple access (SDMA), polarization division multiple access (PDMA), or other modulation techniques known in the art. These modulation techniques demodulate signals received from multiple users of a communication system, enabling an increase in the capacity of the communication system. In connection therewith, various wireless communication systems have been established including, e.g., Advanced Mobile Phone Service (AMPS), Global System for Mobile communication (GSM), and other wireless systems.

In FDMA systems, the total frequency spectrum is divided into a number of smaller sub-bands and each user is given its own sub-band to access the communication medium. Alternatively, in TDMA systems, the total frequency spectrum is divided into a number of smaller sub-bands, each sub-band is shared among a number of users, and each user is allowed to transmit in predetermined time slots using that sub-band. A CDMA system provides potential advantages over other types of systems, including increased system capacity. In CDMA systems, each user is given the entire frequency spectrum for all of the time, but distinguishes its transmission through the use of a unique code.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), and (3) the standard offered by a consortium named "3rd Generation Partnership Project 2" (3GPP2) and embodied in "TR-45.5 Physical Layer Standard for cdma2000 Spread Spectrum Systems" (the IS-2000 standard).

In the above named CDMA communication systems and standards, the available spectrum is shared simultaneously among a number of users, and suitable techniques are available to provide services, such as voice and data services. More recently, systems have been proposed or implemented to deliver data services in a multicast or broadcast manner. One approach for providing such a data service would be to allocate a full carrier frequency to carry the multicast or broadcast signal on a downlink to multiple remote stations. However, such an approach may not be an expeditious use of the available frequency spectrum.

There is therefore a need in the art for delivering multicast signals in a manner which makes expeditious use of the available frequency spectrum.

SUMMARY

In one aspect, a remote station for a wireless communication system is disclosed. The remote station includes a receiver configured to receive on a first downlink a synchronization control channel on a first carrier frequency and on a second downlink a shared physical channel on a second carrier frequency different than the first carrier frequency, the shared physical channel including a first physical shared channel having a unicast signal and a second physical shared channel having a multicast or broadcast signal, the unicast signal being multiplexed in time with the multicast or broadcast signal. The remote station includes a control processor configured to generate an acknowledgement signal on an uplink based on the unicast signal.

In another aspect, a base station for a wireless communication system is disclosed. The base station includes a control processor configured to generate a synchronization control channel and a shared physical channel, the synchronization control channel including a plurality of synchronization control channels, the shared physical channel including a first physical shared channel having a unicast signal and a second physical shared channel having a multicast or broadcast signal, the unicast signal being multiplexed in time with the multicast or broadcast signal. The base station includes a transmitter configured to transmit on a first downlink the synchronization control channel on a first carrier frequency and on a second downlink the shared physical channel on a second carrier frequency different than the first carrier frequency.

In yet another aspect, a machine-readable medium comprising instructions, the instructions when executed by the machine, cause the machine to perform operations is disclosed. The operations include generating a synchronization control channel and a shared physical channel, the shared physical channel including a first physical shared channel having a unicast signal and a second physical shared channel having a multicast or broadcast signal, the unicast signal being multiplexed in time with the multicast or broadcast signal, and transmiting on a first downlink the synchronization control channel on a first carrier frequency and on a second downlink the shared physical channel on a second carrier frequency different than the first carrier frequency.

In yet another aspect, a base station for a wireless communication system is disclosed. The base station includes means for generating a synchronization control channel and a shared physical channel, the shared physical channel including a first physical shared channel having a unicast signal and a second physical shared channel having a multicast or broadcast signal, the unicast signal being multiplexed in time with the multicast or broadcast signal. The base station includes means for transmitting on a first downlink the synchronization control channel on a first carrier frequency and on a second downlink the shared physical channel on a second carrier frequency different than the first carrier frequency.

In yet another aspect, a remote station for a wireless communication system is disclosed. The remote station includes means for receiving on a first downlink a synchronization control channel on a first carrier frequency and on a second downlink a shared physical channel on a second carrier frequency different than the first carrier frequency, the shared physical channel including a first physical shared channel having a unicast signal and a second physical shared channel having a multicast or broadcast signal, the unicast signal being multiplexed in time with the multicast or broadcast signal. The remote station includes means for generating an acknowledgement signal on an uplink based on the unicast signal.

In yet another aspect, a remote station for a wireless communication system is disclosed. The remote station includes a plurality of receivers including a first receiver and a second receiver in parallel with the first receiver. The first receiver is configured to receive on a first downlink, a synchronization control channel on a first carrier frequency and the second receiver is configured to receive on a second downlink a shared physical channel on a second carrier frequency different than the first carrier frequency, the shared physical channel including a first physical shared channel having a unicast signal and a second physical shared channel having a multicast or broadcast signal, the unicast signal being multiplexed in time with the multicast or broadcast signal. The remote station includes a control processor configured to generate an acknowledgement signal on an uplink based on the unicast signal.

In yet another aspect, a method of wireless communication is disclosed. The method includes receiving on a first downlink a synchronization control channel on a first carrier frequency and on a second downlink a shared physical channel on a second carrier frequency different than the first carrier frequency, the shared physical channel including a first physical shared channel having a unicast signal and a second physical shared channel having a multicast or broadcast signal, the unicast signal being multiplexed in time with the multicast or broadcast signal, and generating an acknowledgement signal on an uplink based on the unicast signal.

DETAILED DESCRIPTION

The word "exemplary" is used herein to mean "serving as an example, instance, or illustration." Any embodiment described herein as "exemplary" is not necessarily to be construed as preferred or advantageous over other embodiments.

A remote station, also known as an access terminal (AT), user equipment or subscriber unit, may be mobile or stationary, and may communicate with one or more base stations, also known as base transceiver stations (BTSs) or node Bs. A remote station transmits and receives data packets through one or more base stations to a base station controller, also known as radio network controllers (RNCs). Base stations and base station controllers are parts of a network called an access network. An access network transports data packets between multiple remote stations. The access network may be further connected to additional networks outside the access network, such as a corporate intranet or the Internet, and may transport data packets between each remote station and such outside networks. A remote station that has established an active traffic channel connection with one or more base stations is called an active remote station, and is said to be in a traffic state. A remote station that is in the process of establishing an active traffic channel connection with one or more base stations is said to be in a connection setup state. A remote station may be any data device that communicates through a wireless channel. A remote station may further be any of a number of types of devices including but not limited to PC card, compact flash, external or internal modem, or wireless phone. The communication link through which the remote station sends signals to the base station is called an uplink, also known as a reverse link. The communication link through which a base station sends signals to a remote station is called a downlink, also known as a forward link.

Figure 1:
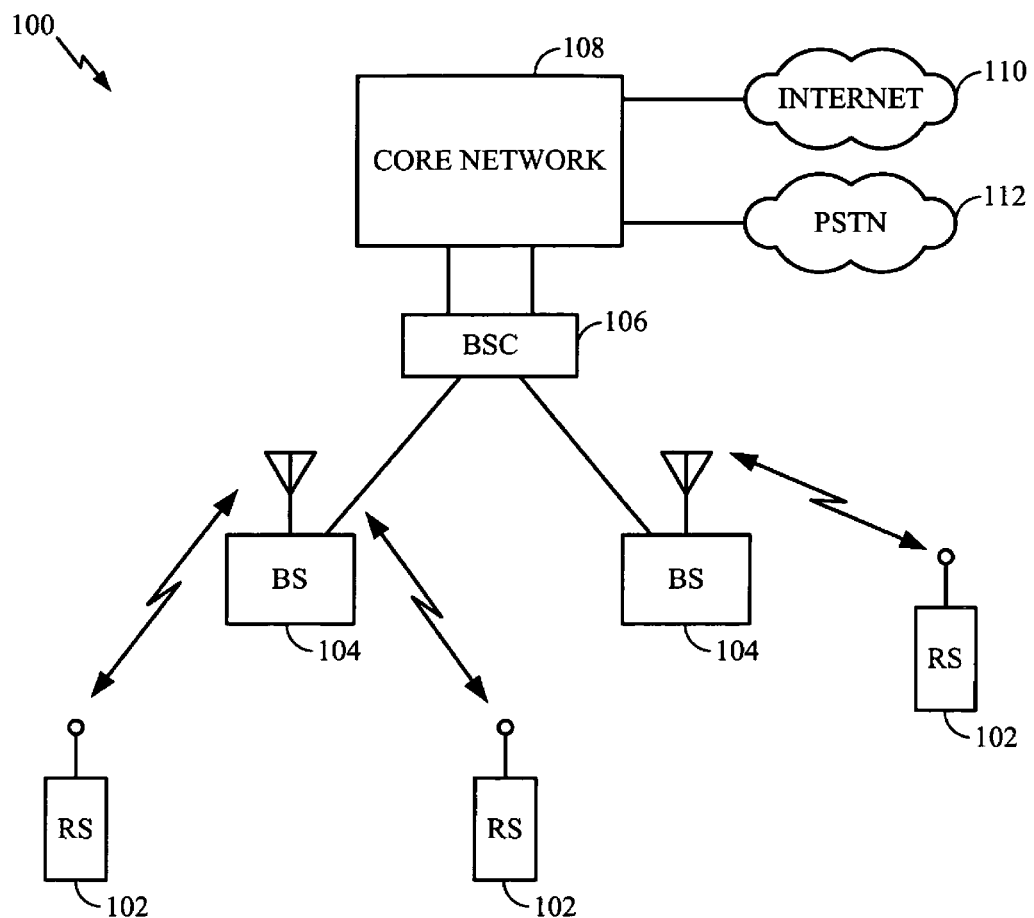
FIG. 1 is an example of a wireless communication system.

With reference to FIG. 1, an exemplary wireless communication system 100 includes one or more remote stations (RS) 102, one or more base stations (BS) 104, one or more base station controllers (BSC) 106, and a core network 108. Core network may be connected to an Internet 110 and a Public Switched Telephone Network (PSTN) 112 via suitable backhauls. Wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Figure 2A:
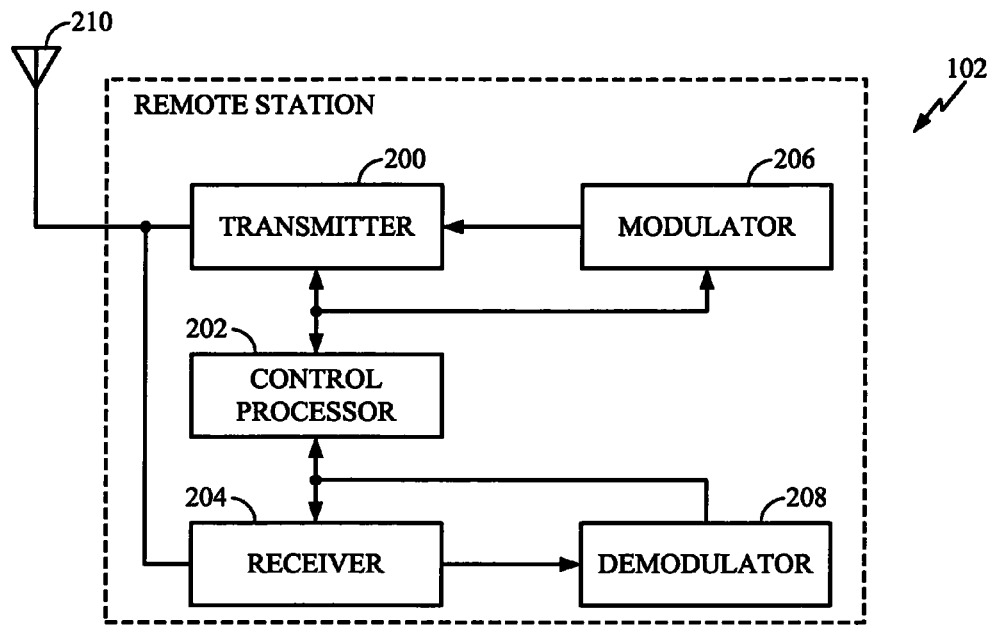
FIG. 2A is a block diagram of a remote station in accordance with an embodiment of the present invention.
Figure 6:
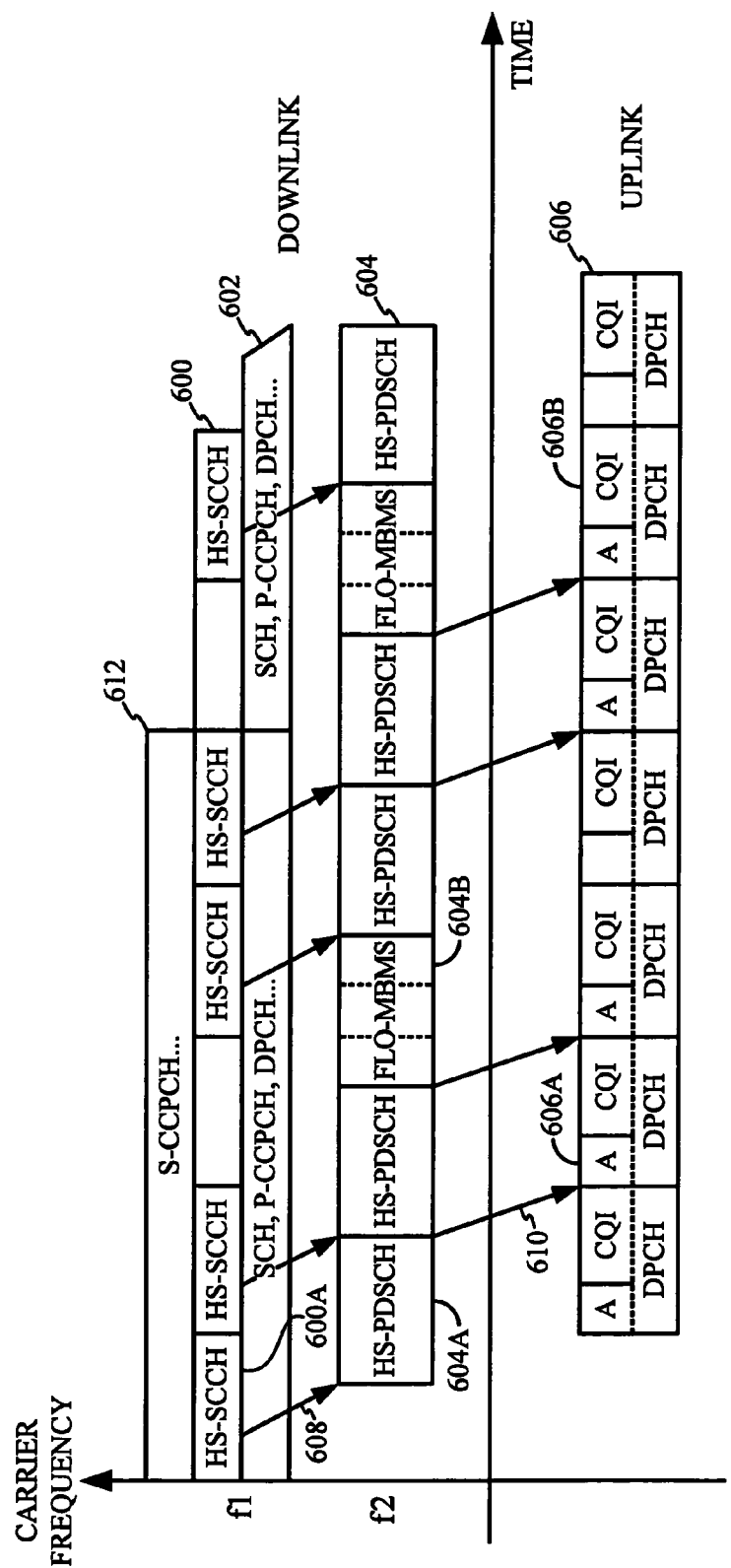
FIG. 6 is a diagram showing signals carried by a given carrier frequency as a function of time in accordance with an embodiment of the present invention.

With reference to FIG. 2A and FIG. 6, in one embodiment, remote station 102 includes a receiver 204 configured to receive on a first downlink a synchronization control channel 600 on a first carrier frequency f1 and on a second downlink a shared physical channel 604 on a second carrier frequency f2 different than first carrier frequency f1, shared physical channel 604 including a first physical shared channel having a unicast signal and a second physical shared channel having a multicast or broadcast signal, the unicast signal being multiplexed in time with the multicast or broadcast signal. Remote station 102 includes a control processor 202 configured to generate an acknowledgement (A) signal on an uplink based on the unicast signal. In one embodiment, synchronization control channel 600 may be a High Speed Synchronization Control Channel (HS-SCCH) and a first physical shared channel having a unicast signal may be a High Speed Physical Downlink Shared Channel (HS-PDSCH) 604a in accordance with the High Speed Downlink Packet Access (HSDPA) standard. A second physical shared channel having a multicast or broadcast signal may be a Flexible Layer One-Multimedia Broadcast Multicast Service (FLO-MBMS) 604b in accordance with one embodiment as shown in FIG. 6, in which case an Orthogonal Frequency Division Multiplexing (OFDM) signal is included in FLO-MBMS 604b.

Figure 7:
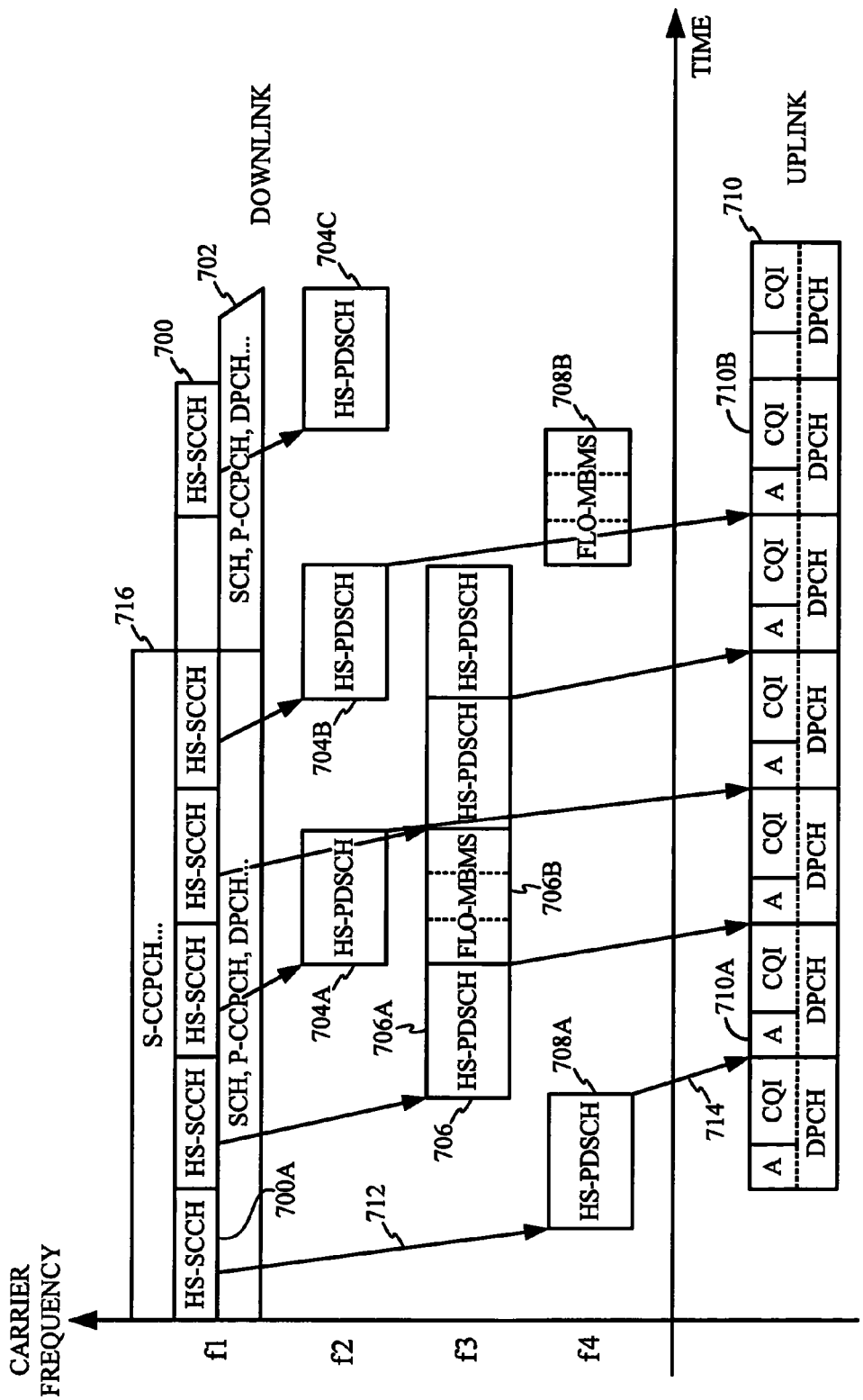
FIG. 7 is a diagram showing signals carried by a given carrier frequency as a function of time in accordance with another embodiment of the present invention.

Continuing with FIG. 2A, remote station 102 includes a transmitter 200, a modulator 206, a demodulator 208, and an antenna 210, the functions of which are known in the art. In the embodiment shown in FIG. 2A, receiver 204 may be a wideband digital receiver suitable for receiving and processing multiple carrier frequencies such as carrier frequency f1 and f2 as shown in FIG. 6 or alternatively carrier frequencies f1-f4 as shown in FIG. 7.

Figure 2B:
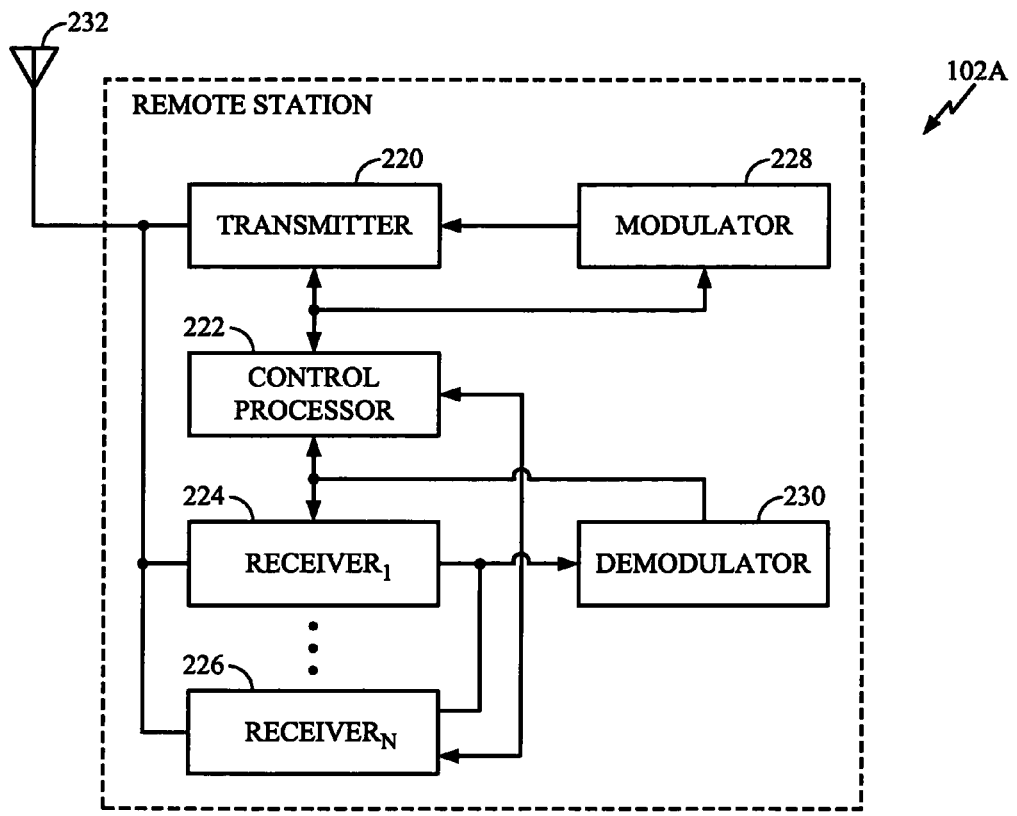
FIG. 2B is a block diagram of a remote station in accordance with another embodiment of the present invention.

With reference to FIG. 2B, a remote station 102A in accordance with another embodiment of the present invention includes a transmitter 220, a modulator 228, a control processor 222, a plurality of receivers including a first receiver 224 and a second receiver 226, a demodulator 230, and an antenna 232. In one embodiment, receivers 224, 226 may be narrowband receivers, each of which receives and processes a corresponding carrier frequency. For example, receiver 224 may receive and process carrier frequency f1 and receiver 226 may receive and process carrier frequency f2, as shown in FIG. 6. The number of receivers, denoted by the integer N, is dependent on the number of carrier frequencies being received by remote station 102A and therefore, N may be any suitable integer greater than 1.

Figure 3:
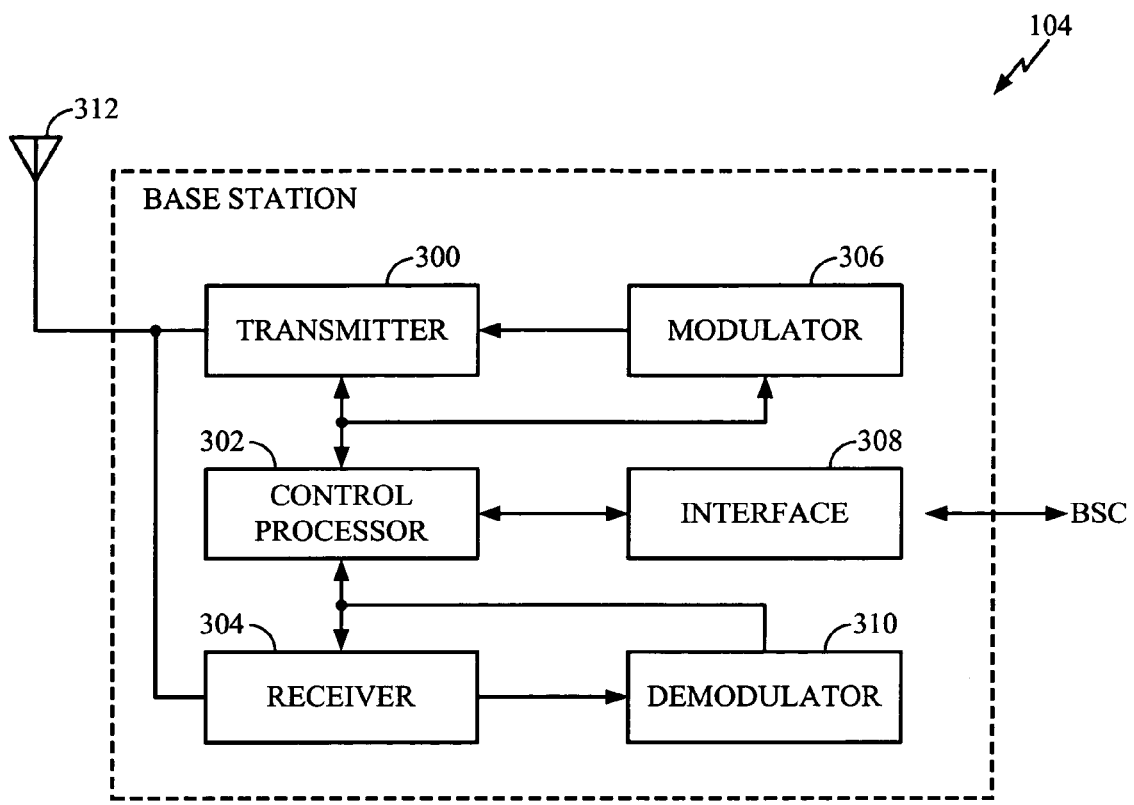
FIG. 3 is a block diagram of a base station in accordance with an embodiment of the present invention.

With reference to FIGS. 3 and 6, in one embodiment, a base station 104 includes a control processor 302 configured to generate a synchronization control channel 600 and a shared physical channel 604, shared physical channel 604 including a first physical shared channel having a unicast signal and a second physical shared channel having a multicast or broadcast signal, the unicast signal being multiplexed in time with the multicast or broadcast signal, and a transmitter 300 configured to transmit on a first downlink synchronization control channel 600 on a first carrier frequency f1 and on a second downlink shared physical channel 604 on a second carrier frequency f2 different than first carrier frequency f1. In one embodiment, synchronization control channel 600 may be a High Speed Synchronization Control Channel (HS-SCCH) 600a and a first physical shared channel having a unicast signal may be a High Speed Physical Downlink Shared Channel (HS-PDSCH) 604a in accordance with the High Speed Downlink Packet Access (HSDPA) standard. A second physical shared channel having a multicast or broadcast signal may be a FLO-MBMS 604b in accordance with one embodiment as shown in FIG. 6, in which case an OFDM signal is included in FLO-MBMS 604b. In another embodiment, transmitter 300 may be configured to transmit on the second downlink a shared physical channel on multiple carrier frequencies, as shown for example in FIG. 7 as carrier frequencies f2, f3, f4, to be described later. Base station 104 includes a modulator 306, an interface 308 for communicating with a BSC, such as BSC 106 shown in FIG. 1, a receiver 304, a demodulator 310, and an antenna 312, the functions of which are known in the art.

Figure 4:
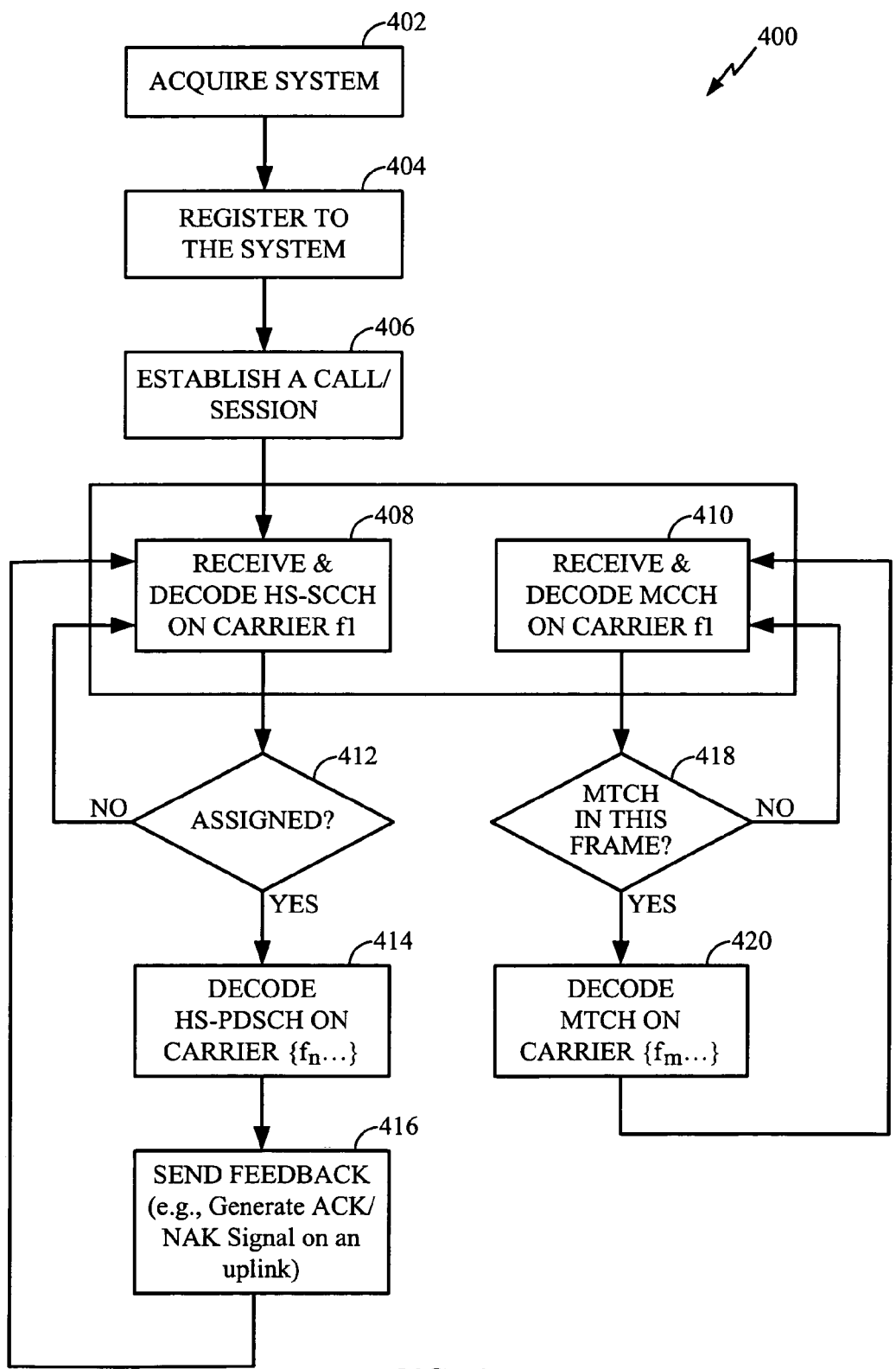
FIG. 4 is a flow diagram of a process which may be implemented in a remote station in accordance with an embodiment of the present invention.

With reference to FIG. 4, a flow diagram of a process 400 in accordance with an embodiment of the present invention is shown in which process 400 may be implemented by a control processor in conjunction with other components of a remote station, such as control processor 203 shown in FIG. 2A or control processor 222 shown in FIG. 2B. At 402, a remote station, such as remote station 102 (see FIG. 2A), acquires the system. At 404, remote station 102 registers to the system and establishes a call/session at 406. At 408, remote station 102 receives and decodes HS-SCCH on a carrier f1, such as HS-SCCH 600a on carrier frequency f1, as shown in FIG. 6. At 412, remote station 102 determines whether or not a unicast signal, such as a unicast signal included in HS-PDSCH 604a (see FIG. 6), has been assigned to it. If yes, at 414, HS-PDSCH 604a is decoded on a carrier, such as carrier frequency f2, and at 416, remote station 102 sends feedback information (e.g., ACK/NAK, CQI) to the base station on an uplink and monitors for additional HS-SCCH channels on carrier f1. If the output at 412 is no, then at 408, remote station 102 monitors for additional HS-SCCH channels on carrier f1.

Continuing with FIG. 4, at 410, remote station 102 receives and decodes a MBMS control channel (MCCH) on carrier f1 which in one embodiment may be performed generally concurrently with the processing described at 408. The MCCH channel is a logical channel which may be mapped onto a suitable transport channel, such as Forward Access Channel (FACH), which in turn may also be mapped onto a suitable physical channel, such as Secondary Common Control Physical Channel (S-CCPCH). The S-CCPCH channel may be carried on carrier frequency f1, as shown in FIG. 6 as 612 or alternatively as 716 in FIG. 7. At 418, remote station 102 determines whether or not a MBMS traffic channel (MTCH) is included in the frame. The MTCH channel is a logical channel which may be mapped onto a suitable transport channel, such as Forward Access Channel (FACH), which in turn may also be mapped onto a suitable physical channel, such as Secondary Common Control Physical Channel (S-CCPCH). If the determination at 418 is yes, the MTCH is decoded on a carrier, which may be the same carrier frequency f2 in a two carrier scheme as shown for example, in FIG. 6. After the MTCH is decoded, remote station 102 monitors for additional MCCH channels to be received and decoded at 410 which is also the case when the determination is "No" at 418.

Figure 5:
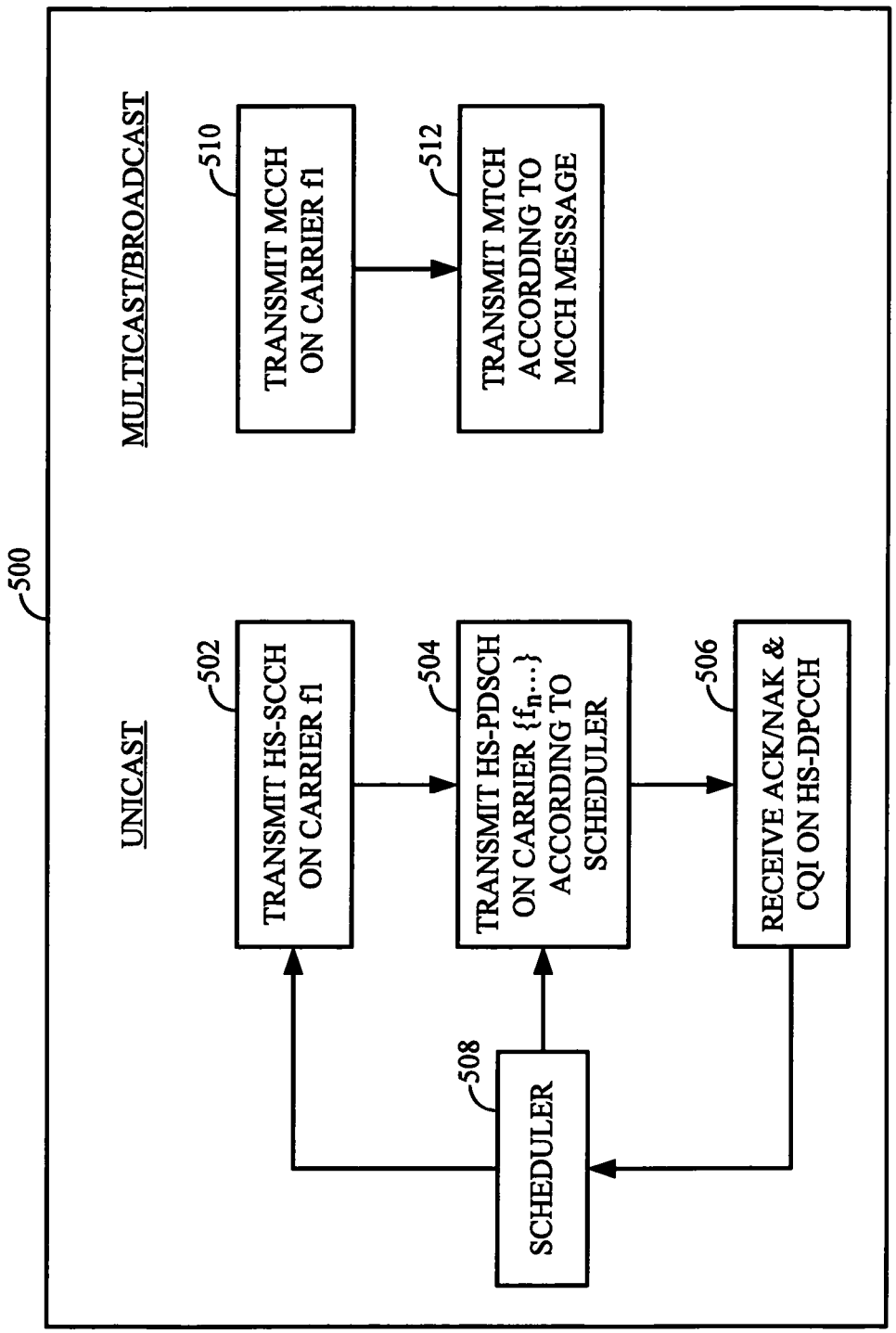
FIG. 5 is a flow diagram of a process which may be implemented in a base station in accordance with an embodiment of the present invention.

With reference to FIGS. 5 and 6, a flow diagram of a process 500 in accordance with an embodiment of the present invention is shown in which process 500 may be implemented by control processor 302 (see FIG. 3) in conjunction with other components of base station 104, e.g., transmitter 300. In terms of the unicast signal portion, a HS-SCCH channel 600a is transmitted on carrier f1 in a subframe of a suitable duration, such as 2 ms. At 504, a HS-PDSCH channel 604a having a unicast signal is transmitted on one of a set of carrier frequencies denoted by {fn . . . } according to a scheduler at 508, and at 506, base station 104 receives an ACK denoted by 606a and CQI information on a HS-DPCCH channel generally represented by 606. If HS-PDSCH 604a was not successfully received by a remote station, then the remote station may send a NAK signal or no signal on an uplink. The ACK/NAK and CQI information are then provided to scheduler 508. In terms of the multicast signal, at 510, a MCCH channel is transmitted on carrier f1 and at 512, a MTCH channel 604b having a multicast signal is transmitted to the remote station on the same carrier as the one used to transmit HS-PDSCH 604a, according to a message contained in the MCCH channel.

Continuing with FIG. 6, a scheme in which two carrier frequencies f1 and f2 are used is shown. The arrows denote associations among the various channels or signals. For example, arrow 608 associates one subframe of HS-SCCH 600a with one subframe of HS-PDSCH 604a in that HS-SCCH 600a includes information which allows a remote station to know that HS-PDSCH 604a is intended for that particular remote station; in addition, arrow 610 associates HS-PDSCH 604a with an ACK signal represented by "A"

606a in that the particular remote station sends back to the base station on an uplink an indication (ACK or NAK) of whether or not HS-PDSCH 604 was successfully received by the particular remote station.

With referenced to FIG. 7, another embodiment of the present invention is shown in which multiple carrier frequencies are used to transmit on a downlink a unicast signal multiplexed in time with a multicast or broadcast signal. In particular, in the embodiment shown, four separate carrier frequencies are used, one (f1) of which is used to carry control information related to the unicast and multicast or broadcast signals carried by the remaining three carrier frequencies f2-f4. The control information is included in a synchronization control channel 700 which includes a HS-SCCH 700a associated with HS-PDSCH 708A via arrow 712 which is in turn associated with "A" 710a via arrow 714. As shown in FIG. 7, a particular remote station receives a shared physical channel defined in part by 704A-704C, a shared physical channel 706, and a shared physical channel defined by 708A, 708B, respectively carried by carrier frequencies f2-f4. The particular remote station sends back to the base station on an uplink an indication (ACK or NAK) of whether or not a given HS-PDSCH, such as HS-PDSCH 708A, was successfully received by the particular remote station and also other channel related information such as CQI 710b.

In another aspect of the present invention, a machine-readable medium comprising instructions, the instructions when executed by the machine, cause the machine to perform operations is disclosed. The operations include generating a synchronization control channel and a shared physical channel, the shared physical channel including a first physical shared channel having a unicast signal and a second physical shared channel having a multicast or broadcast signal, the unicast signal being multiplexed in time with the multicast or broadcast signal, and transmiting on a first downlink the synchronization control channel on a first carrier frequency and on a second downlink the shared physical channel on a second carrier frequency different than the first carrier frequency. In one embodiment, the machine-readable medium may be a disk based medium such as a CD-ROM. In one embodiment, the instructions may be executed within a base station or a base station controller.

In another aspect of the present invention, a base station for a wireless communication system is disclosed. The base station includes means for generating a synchronization control channel and a shared physical channel, the shared physical channel including a first physical shared channel having a unicast signal and a second physical shared channel having a multicast or broadcast signal, the unicast signal being multiplexed in time with the multicast or broadcast signal; such a means for generating may suitably include control processor 302 as shown, for example, in FIG. 3. The base station includes means for transmitting on a first downlink the synchronization control channel on a first carrier frequency and on a second downlink the shared physical channel on a second carrier frequency different than the first carrier frequency; such a means for transmitting may suitably include transmitter 300 as shown, for example in FIG. 3.

In yet another aspect of the present invention, a remote station for a wireless communication system is disclosed. The remote station includes means for receiving on a first downlink a synchronization control channel on a first carrier frequency and on a second downlink a shared physical channel on a second carrier frequency different than the first carrier frequency, the shared physical channel including a first physical shared channel having a unicast signal and a second physical shared channel having a multicast or broadcast signal, the unicast signal being multiplexed in time with the multicast or broadcast signal; such a means for receiving may suitably include receiver 204, as shown for example, in FIG. 2A or alternatively, a plurality of receivers including first receiver 224 and second receiver 226, as shown for example, in FIG. 2B. The remote station includes means for generating an acknowledgement signal on an uplink based on the unicast signal; such a means for generating may suitably include control processor 202 as shown for example, in FIG. 2A or alternatively, control processor 222, as shown for example, in FIG. 2B.

In yet another aspect of the present invention, a method of wireless communication is disclosed. The method includes receiving on a first downlink a synchronization control channel on a first carrier frequency and on a second downlink a shared physical channel on a second carrier frequency different than the first carrier frequency, the shared physical channel including a first physical shared channel having a unicast signal and a second physical shared channel having a multicast or broadcast signal, the unicast signal being multiplexed in time with the multicast or broadcast signal, and generating an acknowledgement signal on an uplink based on the unicast signal.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, in firmware executed by a processor, or in a combination of any of the hardware, software, or firmware schemes. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A remote station for a wireless communication system, the remote station comprising:
    a receiver configured to receive on a first downlink a synchronization control channel on a first carrier frequency and on a second downlink a shared physical channel on a second carrier frequency different than the first carrier frequency, the shared physical channel including a first physical shared channel having a unicast signal and a second physical shared channel having a multicast or broadcast signal, the unicast signal being multiplexed in time with the multicast or broadcast signal, the synchronization control channel controlling use of the unicast signal and the multicast or broadcast signal; and
    a control processor configured to generate an acknowledgement signal on an uplink based on the unicast signal,
    wherein the receiver is configured to receive on a third downlink the shared physical channel on a third carrier frequency different than the first and second carrier frequencies, the shared physical channel on the third downlink including a third physical shared channel having a unicast signal and a fourth physical shared channel having a multicast or broadcast signal, the unicast signal being multiplexed in time with the multicast or broadcast signal.

2. The remote station of claim 1, wherein the multicast or broadcast signal is an Orthogonal Frequency Division Multiplexing signal.

3. The remote station of claim 1, wherein the first physical shared channel is a high speed physical downlink shared channel.

4. A base station for a wireless communication system, the base station comprising:
    a control processor configured to generate a synchronization control channel and a shared physical channel, the shared physical channel including a first physical shared channel having a unicast signal and a second physical shared channel having a multicast or broadcast signal, the unicast signal being multiplexed in time with the multicast or broadcast signal, the synchronization control channel controlling use of the unicast signal and the multicast or broadcast signal; and
    a transmitter configured to transmit on a first downlink the synchronization control channel on a first carrier frequency and on a second downlink the shared physical channel on a second carrier frequency different than the first carrier frequency,
    wherein the transmitter is further configured to transmit the shared physical channel on a third downlink on a third carrier frequency different than the first and second carrier frequencies, the shared physical channel on the third downlink including a third physical shared channel having a unicast signal and a fourth physical shared channel having a multicast or broadcast signal, the unicast signal being multiplexed in time with the multicast or broadcast signal.

5. The base station of claim 4, wherein the multicast or broadcast signal is an Orthogonal Frequency Division Multiplexing signal.

6. The base station of claim 5, wherein the transmitter is configured to transmit on the second downlink the shared physical channel on multiple carrier frequencies.

7. The base station of claim 4, wherein:
    the first physical shared channel is a high speed physical downlink shared channel.

8. A tangible machine-readable medium comprising instructions, the instructions when executed by the machine, cause the machine to perform operations comprising:
    generating a synchronization control channel and a shared physical channel, the shared physical channel including a first physical shared channel having a unicast signal and a second physical shared channel having a multicast or broadcast signal, the unicast signal being multiplexed in time with the multicast or broadcast signal, the synchronization control channel controlling use of the unicast signal and the multicast or broadcast signal;
    transmitting on a first downlink the synchronization control channel on a first carrier frequency and on a second downlink the shared physical channel on a second carrier frequency different than the first carrier frequency; and
    transmitting a third downlink on a third carrier frequency different than the first and second carrier frequencies, the third downlink including a third physical shared channel having a unicast signal and a fourth physical shared channel having a multicast or broadcast signal, the unicast signal being multiplexed in time with the multicast or broadcast signal.

9. The tangible machine-readable medium of claim 8, wherein the instructions when executed by the machine, cause the machine to perform operations, wherein:
    transmitting includes transmitting an Orthogonal Frequency Division Multiplexing signal.

10. The tangible machine-readable medium of claim 8, wherein the instructions when executed by the machine, cause the machine to perform operations, wherein:
    transmitting includes transmitting on a high speed physical downlinked shared channel.

11. A base station for a wireless communication system, the base station comprising:
    means for generating a synchronization control channel and a shared physical channel, the shared physical channel including a first physical shared channel having a unicast signal and a second physical shared channel having a multicast or broadcast signal, the unicast signal being multiplexed in time with the multicast or broadcast signal, the synchronization control channel controlling use of the unicast signal and the multicast or broadcast signal;
    means for transmitting on a first downlink the synchronization control channel on a first carrier frequency and on a second downlink the shared physical channel on a second carrier frequency different than the first carrier frequency; and means for transmitting the shared physical channel on a third downlink on a third carrier frequency different than the first and second carrier frequencies, the shared physical channel on the third downlink including a third physical shared channel having a unicast signal and a fourth physical shared channel having a multicast or broadcast signal, the unicast signal being multiplexed in time with the multicast or broadcast signal.

12. The base station of claim 11 wherein the multicast or broadcast signal is an Orthogonal Frequency Division Multiplexing signal.

13. The base station of claim 12, wherein the means for transmitting is configured for transmitting on the second downlink the shared physical channel on multiple carrier frequencies.

14. The base station of claim 11, further comprising:
means for transmitting includes means for transmitting on a high speed physical downlinked shared channel.

15. The base station of claim 11, further comprising:
means for transmitting includes means for transmitting on an Orthogonal Frequency Division Multiplexing signal.

16. A remote station for a wireless communication system, the remote station comprising:
means for receiving on a first downlink a synchronization control channel on a first carrier frequency and on a second downlink a shared physical channel on a second carrier frequency different than the first carrier frequency, the shared physical channel including a first physical shared channel having a unicast signal and a second physical shared channel having a multicast or broadcast signal, the unicast signal being multiplexed in time with the multicast or broadcast signal, the synchronization control channel controlling use of the unicast signal and the multicast or broadcast signal; and
means for generating an acknowledgement signal on a uplink based on the unicast signal,
wherein the means for receiving is further configured to receive on a third downlink the shared physical channel on a third carrier frequency different than the first and second carrier frequencies, the shared physical channel on the third downlink including a third physical shared channel having a unicast signal and a fourth physical shared channel having a multicast or broadcast signal, the unicast signal being multiplexed in time with the multicast or broadcast signal.

17. The remote station of claim 16, wherein the multicast or broadcast signal is an Orthogonal Frequency Division Multiplexing signal.

18. The remote station of claim 16, wherein the first physical shared channel is a high speed physical downlink shared channel.

19. A remote station for a wireless communication system, the remote station comprising:
a plurality of receivers including a first receiver and a second receiver in parallel with the first receiver;
the first receiver configured to receive on a first downlink a synchronization control channel on a first carrier frequency;
the second receiver configured to receive on a second downlink a shared physical channel on a second carrier frequency different from the first carrier frequency, the shared physical channel including a first physical shared channel having a unicast signal and a second physical shared channel having a multicast or broadcast signal, the unicast signal being multiplexed in time with the multicast or broadcast signal, the synchronization control channel controlling use of the unicast signal and the multicast or broadcast signal; and
a control processor configured to generate an acknowledgement signal on an uplink based on the unicast signal,
wherein the second receiver is further configured to receive on a third downlink the shared physical channel on a third carrier frequency different than the first and second carrier frequencies, the shared physical channel on the third downlink including a third physical shared channel having a unicast signal and a fourth physical shared channel having a multicast or broadcast signal, the unicast signal being multiplexed in time with the multicast or broadcast signal.

20. The remote station of claim 19, wherein the multicast or broadcast signal is an Orthogonal Frequency Division Multiplexing signal.

21. The remote station of claim 19, wherein the first physical shared channel is a high speed physical downlink shared channel.

22. A method of wireless communication comprising:
receiving on a first downlink a synchronization control channel on a first carrier frequency and on a second downlink a shared physical channel on a second carrier frequency different than the first carrier frequency, the shared physical channel including a first physical shared channel having a unicast signal and a second physical shared channel having a multicast or broadcast signal, the unicast signal being multiplexed in time with the multicast or broadcast signal, the synchronization control channel controlling use of the unicast signal and the multicast or broadcast signal; and
generating an acknowledgement signal on a uplink based on the unicast signal; and
receiving on a third downlink the shared physical channel on a third carrier frequency different than the first and second carrier frequencies, the shared physical channel on the third downlink including a third physical shared channel having a unicast signal and a fourth physical shared channel having a multicast or broadcast signal, the unicast signal being multiplexed in time with the multicast or broadcast signal.

23. The method of claim 22, wherein the multicast or broadcast signal is an Orthogonal Frequency Division Multiplexing signal.

24. The method of claim 22, further comprising:
receiving the first physical shared channel includes receiving on a high speed physical downlinked shared channel.

* * * * *